Figure 1:
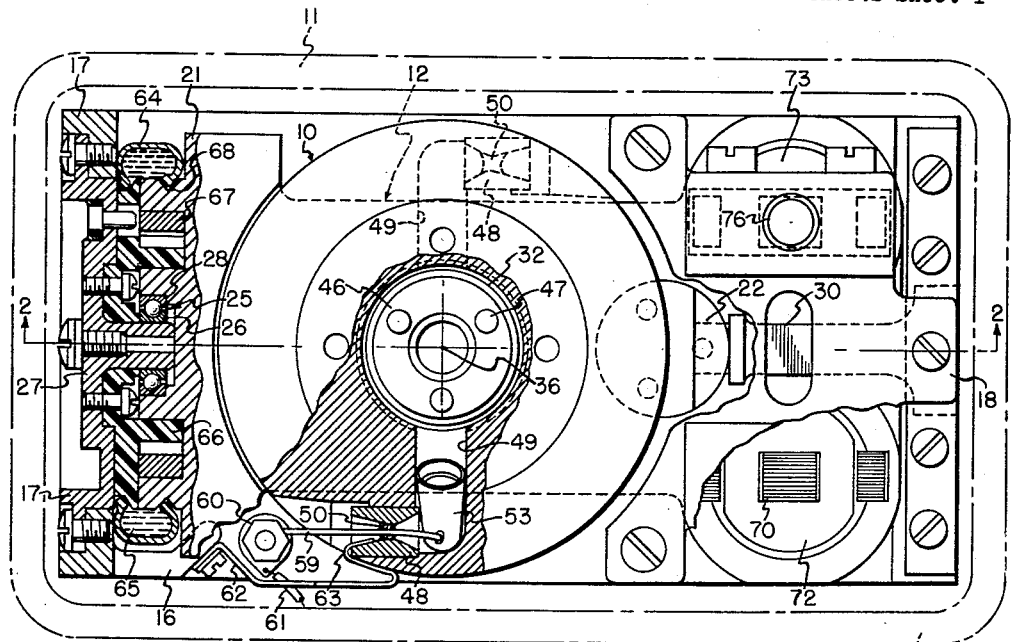

Nov. 22, 1960  F. SAPHRA  2,960,876
GYROSCOPIC INSTRUMENTS
Filed Dec. 19, 1957  3 Sheets-Sheet 1

INVENTOR
FREDERICK SAPHRA
BY Arthur H. Serrell
ATTORNEY

Nov. 22, 1960 F. SAPHRA 2,960,876
GYROSCOPIC INSTRUMENTS
Filed Dec. 19, 1957 3 Sheets-Sheet 3

INVENTOR
FREDERICK SAPHRA
BY Arthur H. Serrell
ATTORNEY

United States Patent Office 2,960,876
Patented Nov. 22, 1960

2,960,876

GYROSCOPIC INSTRUMENTS

Frederick Saphra, Levittown, N.Y., assignor to Sperry Rand Corporation, a corporation of Delaware Filed Dec. 19, 1957, Ser. No. 704,229

18 Claims. (Cl. 74—5.7)

This invention relates to an improved gyroscopic instrument of the rate gyro type. The rotor of the improved device is preferably mounted with restrained freedom about its ring axis and is driven reactively by means of the expanding gases resulting from the firing of a solid propellent grain located in a closed chamber therein. The instrument is useful over a relatively short time span as a component of a guidance system or automatic pilot for a missile or craft to provide a measure of the rate of change of craft or missile motion about an axis thereof. Instruments of this character may be located on the missile or craft to provide yaw, pitch and roll rate information for the system or pilot. Such an instrument is fixedly arranged on the missile or craft with its ring and rotor axes in normally mutually perpendicular relation to any axis of the craft or missile for which it is desired to obtain the noted type of data.

Advantages of the propellent driven rate gyro instrument over those where the rotor is driven electrically reside in the elimination of extensive power equipment for bringing the rotor up to speed, the saving of time required in starting up the instrument and in getting the rotor to its operating speed from a standstill condition, and in reduction in the maintenance requirements needed to assure proper functioning of the device.

An object of the present invention is to utilize the reaction gases of a burning propellent grain contained within a chamber in the rotor to drive the rotor of a gyroscopic instrument of the character described.

A further object of the invention is to facilitate disassembly and reassembly of the propellent grain in the rotor of the instrument enabling such devices to be shipped without the grain and reassembled where the devices are to be used.

The features of the invention include an open-sided gimbal ring structure with a cantilever supported rotor on the ring, and a rotor structure with a removable end plate at the open side of the ring facilitating access to the propellent grain containing chamber within the rotor.

Another feature is provided by a detonator for igniting the grain that is adapted to fit in one of the openings in the nozzle means contained in the rotor.

A further feature of the invention is in the provision in the instrument of a disengageable means for holding the rotor in a stationary condition at one of the openings provided in the rotor by the nozzle means therein.

Figure 2:
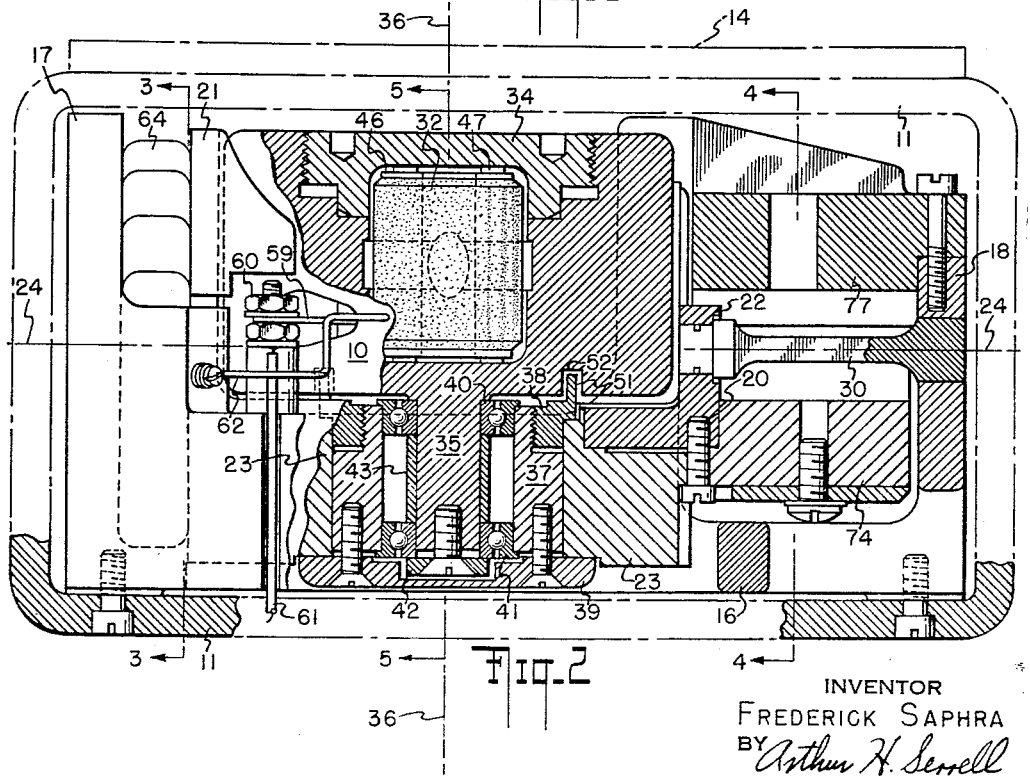
Figure 3:
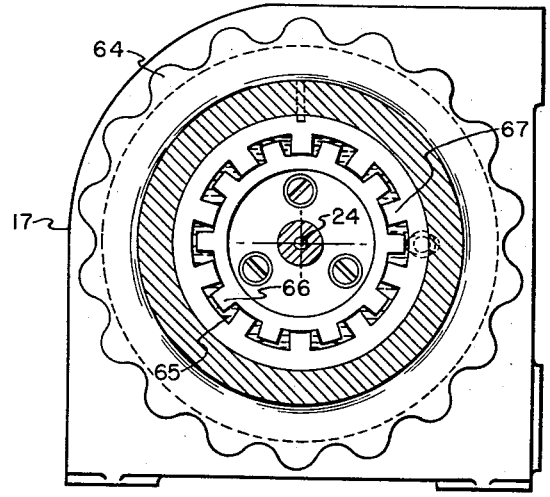
Figure 4:
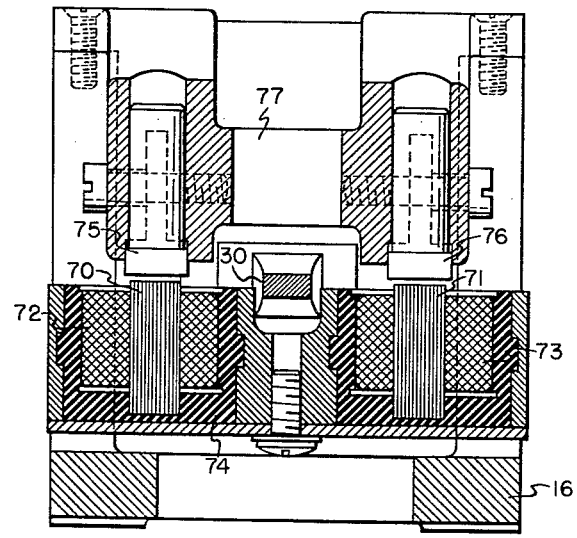
Figure 5:
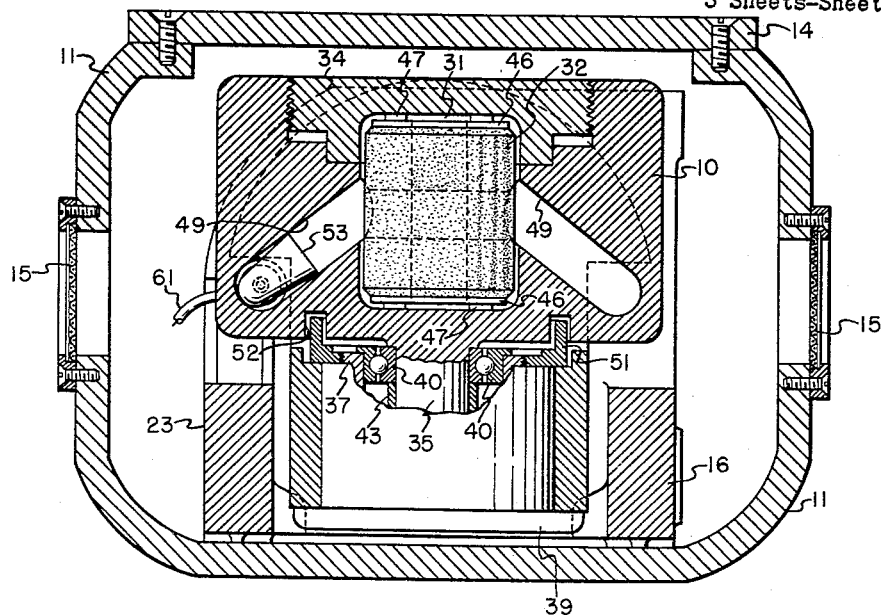
Figure 6:
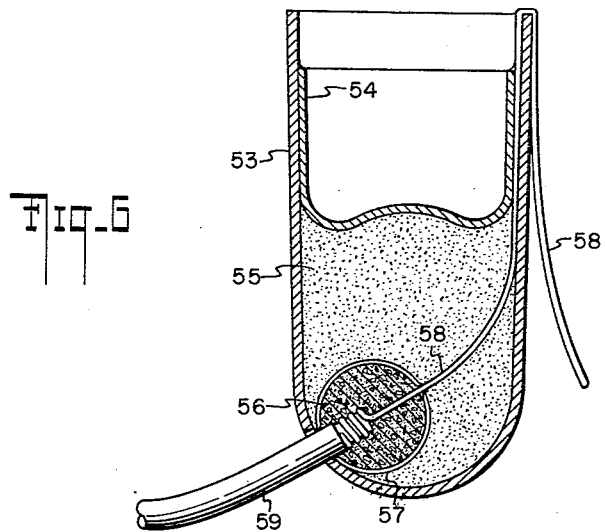

Other objects, features and structural details of the present invention will appear from the following description of the preferred embodiment of the improved gyroscopic instrument herein illustrated in the accompanying drawings, in which, Fig. 1 is a top plan view partly in section showing a gyroscopic instrument embodying the present inventive concepts, Fig. 2 is a sectional view taken in line 2—2, in Fig. 1, Fig. 3 is a sectional view taken on line 3—3, in Fig. 2, Fig. 4 is a sectional view taken on line 4—4, in Fig. 2, Fig. 5 is a sectional view taken on line 5—5, in Fig. 2, and Fig. 6 is an enlarged detail cross sectional view of the detonator utilized in the improved instrument to ignite the propellent grain.

As shown in Figs. 1 and 5 of the drawing, the improved gyroscopic instrument is a single degree of freedom or rate type of gyro in which the rotor 10 is supported within a housing 11 by a gimbal ring 12. The housing element 11 of the device is preferably a closed container that is sealed to the atmosphere primarily to exclude dust and moisture. As particularly shown in Fig. 5, the housing 11 includes a removable plate 14 in a wall thereof at the open side of the gimbal ring 12 adjacent to the end of the rotor 10 that is opened to receive the propellent grain. This view also shows a pair of breakable paper and wire mesh covered openings in the housing 11 which permit gas to vent from the housing to the atmosphere when the instrument is fired. The mesh and paper seals for the vent openings included in the housing 11 are indicated at 15. It will be understood that the paper component of the respective seals breaks as the pressure of the gases within the housing rises due to the burning of the grain.

The ring and rotor elements of the improved gyro are supported within the housing 11 between the arms of a bracket type frame 16 that is suitably secured to the housing by means of bolts or otherwise as shown in Fig. 2. The spaced arms of the frame 16 are designated at 17 and 18. Ring 12 of the device is constructed of two parts interconnected by a screw fastening 20 as shown in Fig. 2. The assembled gimbal ring is double-ended and singled-sided, the respective ends thereof being indicated at 21, 22 and the side thereof at 23. As shown in Fig. 5, the open side of the U-shaped gimbal ring 12 of the device is located within the housing 11 on the frame 16 adjacent the removable plate 14 by which access is afforded to the rotor 10.

Means are provided for supporting the ring and rotor with freedom about a ring axis 24, such means being located between the respective ends 21, 22 of the ring and the spaced arms 17, 18 of the frame 16. In Fig. 1, such means is shown to include bearing means 25 with an inner race 26 mounted on the hub of a mounting plate 27 suitably fixed to the bracket arm 17 of the frame 16. The cooperating outer race 28 of the bearing 25 is mounted in an axially recessed portion of the end 21 of the gimbal ring 12. As shown in Fig. 2, the means interconnecting the frame and ring also supports the ring with restrained freedom about the axis 24, the connection provided for this purpose being an elongated spring piece 30 of rectangular cross section normal to the axis. The elongated dimension is preferably parallel to the line of maximum normal acceleration to minimize acceleration deflections. As shown, one end of the spring piece 30 is suitably secured to the end 22 of ring 12 and the other end is likewise affixed to the arm 18 of the frame. Supporting spring 30 extends lengthwise along the axis 24 between the spaced members to which it is fixedly connected. The arrangement of the described parts of the device is such that the spring 30 is normally effective to locate the open side of the ring 12 adjacent to the housing plate 14. In the operation of the rate gyro instrument to provide an output, relative displacement between the ring 12 and housing 11 occurs due to precession of the ring 12 about the axis 24. The portion of the spring 30 between its ends twists during operation of the device to permit the precession to occur while exerting an opposing force that is effective to restore the parts to their normal relation. The support provided for the double-ended ring 12 accordingly includes bearing means between one end of the ring and housing and spring restraining means between the other end of the ring and housing.

The gyroscopic rotor 10 of the improved instrument is a reaction type rotor with an internal chamber 31 therein adapted to receive a propellant grain indicated at 32. As particularly shown in Figs. 2 and 5, the rotor structure includes a removable plate 34 at the open end portion of the rotor facilitating access to the cylindrical chamber 31. A spindle 35 is provided at the closed end portion of the rotor opposite to the plate 34. In the provided arrangement, the rotor 10 is supported through its spindle 35 as a cantilever at the closed side 23 of the ring 12. The rotor axis 36 of the device is located in mutually perpendicular relation to the ring axis 24, the closed end cylindrical chamber 31 and spindle 35 being concentric to the axis 36. The plate 34 is connected to the rotor at the open side of the ring 12 adjacent to the removable housing plate 14 to close the open end of the chamber 31. With this construction, the grain 32 may be readily removed from and reloaded in the rotor without disturbance to the parts of the device supporting the rotor. This enables the device to be shipped to its use location in an unloaded condition where the same are readily reloaded by removal and replacement of the housing plate 14 and rotor plate 34.

As shown in Fig. 2, the cantilever mounted rotor 10 is supported by bearing means between the single closed side 23 of the gimbal ring 12 and the spindle portion thereof. This structure includes a mounting tube 37, a flanged ring 38 connected to the tube 37 and a holding piece 39 fastened to the tube 37 and engaging the outer wall of the gimbal ring 12. The inner wall of the gimbal part 23 includes a circular recess in which the flanged ring 38 fits. The ring mounted tube 37 extends axially along the rotor axis 36 and includes at the respective inside ends thereof, the outer races of the spaced roller bearings 40, 41. Piece 39 also serves as a cover plate that positively seals one end of the bearing assembly including bearings 40 and 41. The cooperating inner races of this bearing structure are mounted on the spindle 35 by a removable plate 42 fastened to the end of the spindle and a spacing sleeve 43 located between the inner bearing races. The rotor 10 is accordingly supported as a cantilever on the single side of the ring 12 to spin about an axis normal to the ring axis 24. The removable plate 34 located at the end of the rotor 10 at the open side of the ring 12 closes the propellant receiving chamber 31. As shown in Fig. 2, the instrument is designed to provide substantial balance in the weight distribution of the parts with respect to axis 24. In this regard, the rotor 10 is designed so that the portion of the same overhanging the axis 24 is of an appropriate weight to counterbalance the single-sided gimbal structure and the bearing structure for the rotor at the closed side of the ring.

The means provided to spin the rotor 10 of the instrument includes an ignitible chemical propellant grain 32 of solid form that requires no oxygen for combustion purposes. The chemical composition and configuration of the solid grain 32 may be that of the type produced by the Hercules Powder Co. under the designation "ADV." As shown in Fig. 2, the propellant grain 32 is contained within the chamber 31 provided to receive the same in the rotor 10. The cylindrical or annular grain configuration shown has an outside diameter less than the diameter of the chamber and includes a central opening therein. The lengthwise dimension of the grain 32 is also less than the axial length of the chamber 31 with the rotor plate 34 in a mounted position. To facilitate even firing of the described type of grain, washer elements 46 of consumable material are secured to the respective ends of the grain. The elements 46 include external lugs 47 thereon which space the grain from the respective ends of the chamber 31. The elements 46 provide a mounting means for supporting the grain 46 within the chamber 31 in peripheral spaced relation to the side wall of the chamber and end spaced relation to the inside end wall of the chamber and the internal end wall of the attached rotor plate 34. In this construction, the central opening in the annular grain communicates with the respective openings provided at the ends of the grain by the mounting washers. A grain of the described type is preferably mounted within the rotor chamber 31 in spaced relation to its wall structure.

The propellant grain 32 is ignited to start the improved instrument. The ignited grain fires in a fraction of a second and the resulting combustion gases thereof at a high pressure within the chamber 31 exhaust through nozzle means included in the rotor 10 to, by reaction, cause the rotor to accelerate about its axis 36 from a standstill condition to a high spinning speed in a correspondingly short time. The instrument is operative during the starting period as well as the time interval during which the rotor is coasting as it loses its angular momentum.

As shown in Figs. 1 and 5, the nozzle means in the rotor 10 of the instrument include a pair of symmetrically arranged passageways or openings therein adapted to direct the exhaust gases from the rotor chamber 31 in respective streams perpendicular to the spin axis 36 and in a plane including the ring axis 24. The structure shown for this purpose is provided by a pair of venturi tubes or nozzles 48 located at the periphery of the rotor 10 whose respective axes lie in a plane including the ring axis 24 and are directed at equal radial distances from and perpendicular to the rotor axis 36. Because of the overhang arrangement of the rotor with relation to axis 24, the passageways or openings 49 connecting the respective tubes 48 with the central part of the rotor chamber 31 have entrance and exhaust portions that are displaced along the axis of the rotor as shown in Fig. 5. The connection of the passageways 49 to the chamber 31 are at a location equidistant from the closed end portion of the chamber and the connected plate 34.

The improved rate gyro instrument includes a seal structure for preventing the flow of reactive gases during the rotor along the rotor axis 36 through the bearing assembly for the rotor. This structure is provided as shown in Fig. 2 by a cooperating annular flange 51 on the ring 38 element of the gimbal 12 and a groove 52 cut in the rotor 10. These parts are arranged in concentric relation to the rotor axis, one of the same being on the ring and the other on the rotor. The flange element of the structure provides an annular wall in the open area between the ring and rotor that restricts any flow of gas within the housing 11 in a radial direction toward the rotor axis and into the assembly structure including the spaced bearings 40, 41. The other end of the structure sealing the bearings 40, 41 is provided by the cover plate piece 39.

With reference to Figs. 1, 2, 5 and 6, the means provided herein for igniting the propellent grain 32 includes a detonator having an electrical input lead and a ground connection to the rotor fitting in one of the openings provided in the rotor by the nozzle means. As shown in Fig. 6, the detonator is a closed cup 53 and cover 54 of combustible matter such as nitrocellulose material containing black powder 55. A more readily ignited chemical substance 56 contained in a similarly combustible capsule 57 may be included in the portion of the cup containing the powder 55. The cup 53 is shaped to fit in the opening 49 of the nozzle means and is inserted therein through the open end of the rotor 10. The electrical ground connection of the detonator is provided by a high resistance lead 58 which extends through chemical substance 56, capsule 57 and powder 58 in the cup 53. One end of the resistance wire is bent over the lip of the cup 53 and cemented to the cup with conducting paint, a band of which is painted all around the cup. Further, the wire is pressed against the wall of the opening 49 when the cup 53 is inserted in the rotor. An insulated input lead 59 from a binding post 60 on the frame 16 extends through the venturi tube 48 and passageway 49 and is connected to the end of the wire 58 within the capsule 57. The input lead extends through openings provided in the cup 53 and capsule 57. In inserting the detonating capsule in the rotor, the external input lead wire 59 is first threaded through the channel 49 and tube 48. Both nozzles are then sealed hermetically with a soft sealing compound 50 such as Duxeal, which is ejected upon ignition. The detonator is electrically fired by supplying energy from a suitable source to the grounded resistance wire connection to the rotor by way of input lead 59. Such energy is supplied by an input lead 61 to the binding post 60. The instrument is started by closing an energizing circuit through leads 61, 59 to the grounded resitance wire thereby firing the chemical 57 and powder 55 which results in the ignition of the propellent grain 32. In the same instant, the cup 53, cover 54 and capsule 57 are consumed, the input lead 59 and sealing compound 50 are ejected. The combustion gases of the ignited grain then pass through the respective open passageways 49 and nozzles 48 to spin the rotor 10.

To prevent the lead 59 from becoming stressed when the instrument is non-operative, disengageable means are provided for normally holding the rotor 10 in a stationary condition. Such means is adapted to engage at least one of the passages provided in the rotor by the nozzle means. As shown in Fig. 1, the holding means comprises a double-ended spring 62, one end of which is suitably anchored to the frame 16. The other end of the spring has a hooked lip portion 63 that fits in one of the passages provided by the nozzle means in the rotor. In the construction shown, the biased end of the spring lip 63 engages a portion of the internal wall at the exhaust end of the venturi tube 48. The hook portion of the spring 62 is bent so as to also engage the outside surface of the rotor 10, the structure being such as to permit the rotor 10 to move counter-clockwise as viewed in Fig. 1 when it is fired but otherwise to hold the same in a stationary condition. The bias of the spring is such as to move its disengageable end clear of the rotor 10 when the instrument is fired. The spring also provides a positive ground return for the ignition circuit. If absolute ignition reliability is required, two such detonators may be provided, one in each nozzle.

The improved instrument is damped about the ring axis 24, as shown in Figs. 1 and 3, by fluid damping means provided between the arm 17 of the frame 16 and the end 21 of the U-shaped ring 12. The damping means structure provided includes a flexible tire or torodial element 64 connected at its rim to both the frame and ring. Tire 64 contains a viscous damping fluid which is preferably silicone 65. The cooperating parts of the damper include spaced toothed gears of nylon and aluminum which operate in the silicone fluid, one of the gears being fixed to the frame and the other being fixed to the ring 12. The nylon gear 66 of the damper is shown in Fig. 3 as being fixedly connected to the inside wall of the mounted plate 27 secured to the arm 17 of the stationary frame 16. The movable aluminum gear 67 of the combination is suitably anchored in a circular recess in the end 21 of the ring 12. Relative movement between the parts occurs about ring axis 24 when the ring is precessed. The degree of angular motion permitted between the parts by the restraining spring 30 is limited to an extent that is smaller than the spacing between the side walls of the toothed gears shown in Fig. 3. In operation, the damper acts as a pump that causes the flow of fluid between the areas on the respective sides of the cooperating gear teeth. Since the nylon gear 66 has a greater temperature coefficient of expansion than the aluminum gear 67, an increase in the temperature conditions of operation of the device results in a reduction in the clearance between the gear parts. This reduction compensates for the decrease in the viscosity of the silicone damping fluid with the same temperature increase so that the damping structure provided operates with a substantially constant damping characteristic unaffected over the range of variable temperature conditions under which the instrument is used. The damping means is located at the end of the ring 12 including the bearing means 25. The end 21 of the ring includes a groove 68 that receives one of the rims of the flexible toroidal element or tire 64. The other rim of the tire 64 is secured in a circumferential groove between the fixed gear 66 and the inside wall of the mounting plate 27.

The housing 11 of the instrument is fixedly located in a suitable manner on the craft or missile in which it is used with its rotor axis 36 and ring axis 24 arranged in perdendicular relation to the craft or missile axis for which it is desired to obtain the rate information. If rate information about the craft pitch axis is desired, for example, the housing may be located therein so that the rotor axis is vertical and coincident with or parallel to the yaw axis of the craft and the gimbal ring axis is horizontal and coincident with or parallel to the roll axis of the craft.

The output measure of the improved instrument is determined by the limited movement of the ring 12 about its axis 24 under restraint of the spring piece 30 from a normal condition with relation to the frame 16 or housing 11. As shown in Figs. 1, 2 and 4, the output measure of the instrument is provided by an electrical signal pick-off means which is located at the end of the ring 12 including the spring restraining means or piece 30. The pick-off means includes electrical wound rotor and armature stator parts that are respectively connected to the ring 12 and frame 16 of the instrument. As shown, the rotor is provided by two differentially connected, E-shaped flux conducting pieces 70 and 71 with respective central coil windings 72 and 73. Pieces 70, 71 are arranged in balanced relation to the axis 24 on a mounting plate 74 which is screw connected to the end 22 of the ring 12 as shown in Fig. 2. The cooperating armature elements 75 and 76 for the respective pieces 70 and 71 are adjustably mounted on a further mounting plate 77 that is connected to the arm 18 of the frame 16. In operation, the spacings between the armature parts 75, 76 and pieces 70, 71 varies differentially to produce an electrical output whose amplitude is dependent on the degree of the change in spacing and whose phase depends on the sense of such change as dependent on the direction of the precession of the ring 12 with relation to the housing as the instrument operates. The pick-off means described is supplied with electrical energy from a suitable electrical source.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A gyroscopic instrument of the rate gyro type having a normally closed housing, a breakable atmospheric seal included on said housing permitting gas to vent therefrom to the atmosphere when the instrument is fired, a U-shaped gimbal ring having two ends, a closed side and an open side; means supporting the ring in said housing to precess about a ring axis including spring restraining means connecting one end of the ring and housing and bearing means connecting the other end of the rig and housing; viscous damping means at the end of the ring including said bearing means, pick-off means at the end of the ring including said spring restraining means, a gyroscopic rotor of the reaction type having a closed and open ended cylindrical chamber therein adapted to receive a propellant grain, a removable plate closing the open end of said gyroscopic rotor facilitating access to the chamber, a spindle at the closed end of said gyroscopic rotor, means between the closed side of the ring and spindle supporting the rotor to spin about an axis normal to the ring axis with the removable plate at the open side of the gimbal ring, nozzle means in said gyroscopic rotor providing a passage to the chamber located in a plane including the ring axis, an ignitible propellent grain enclosed within said chamber by said removable plate, a detonator for igniting the grain having an electrical input lead and a ground connection to the gyroscopic rotor fitted in the passage provided in said rotor by said nozzle means, and spring biased holding means for the gyroscopic rotor having an end fixed to said housing and an end hooked to the internal wall of the passage provided in said rotor by said nozzle means.

2. In a rate gyro, a frame, a U-shaped gimbal ring having two ends, a closed side and an open side, means interconnecting the frame and gimbal ring at the respective ends thereof supporting the ring with restrained freedom about an axis, a gyroscopic rotor of the reaction type having a closed and open ended cylindrical chamber therein adapted to receive a propellent grain, a removable plate closing the open end of said gyroscopic rotor facilitating access to the chamber, a spindle at the closed end of said gyroscopic rotor, bearing means between the closed side of the gimbal ring and spindle supporting the gyroscopic rotor to spin about an axis normal to the ring axis with the removable plate at the open side of the gimbal ring, nozzle means in said gyroscopic rotor providing a passage to the chamber located in a plane including the ring axis, a detonator for igniting the grain fitted in the passage provided in said gyroscopic rotor by said nozzle means, and means for holding the gyroscopic rotor in a stationary condition comprising a disengageable spring having a biased end engaged with the wall of the passage provided in said rotor by said nozzle means.

3. The combination in a gyroscopic instrument of, a frame, a U-shaped ring having two ends, a closed side and an open side supported at its ends on the frame with freedom about an axis, a gyroscopic rotor of the reaction type having a closed and open ended cylindrical chamber therein adapted to receive a propellent grain, a removable plate closing the open end of said gyroscopic rotor facilitating access to the chamber, a spindle at the closed end of said gyroscopic rotor, bearing means between the closed side of the ring and spindle supporting the gyroscopic rotor to spin about an axis normal to the ring axis with the removable plate at the open side of the ring, nozzle means in said gyroscopic rotor providing a passage to the chamber located in a plane including the ring axis, a detonator for igniting the grain having an electrical input lead and a ground connection to the gyroscopic rotor fitted in the passage provided in said rotor by said nozzle means, and a disengageable spring having an end fixed to the frame and a biased end hooked to the internal wall of the passage provided in said gyroscopic rotor by said nozzle means to hold the rotor in a stationary condition.

4. In a gyroscopic instrument, a gyroscopic rotor of the reactive drive type having a closed end cylindrical chamber therein concentric with its axis adapted to receive an ignitible propellent grain, a removable end plate for the gyroscopic rotor facilitating access to the chamber, and a cylindrical propellent grain of a diameter less than the diameter of the chamber having ignitible end parts for supporting the grain within the chamber in peripheral spaced relation to the side wall of the chamber and end spaced relation between the inside closed end of the chamber and the internal wall of the attached rotor plate.

5. An instrument as claimed in claim 4, in which the grain is annularly shaped with a central opening that communicates with the respective openings provided at the ends of the grain by said end parts.

6. In a gyroscopic instrument, a gyroscopic rotor of the reactive drive type having a cylindrical chamber therein adapted to receive an ignitible propellent grain, nozzle means in said rotor providing a passage to said chamber, a propellent grain contained in said chamber, and a detonator for igniting the grain having an electrical input lead and a ground connection to the rotor fitted in the passage provided in said rotor by said nozzle means.

7. An instrument as claimed in claim 6, in which said detonator is a closed cup and cover of nitro-cellulose material containing powder.

8. An instrument as claimed in claim 6, in which the ground connection is a spring that engages the passage in the nozzle means to maintain the rotor in a normally stationary condition.

9. The combination in an instrument of the class described of, a gyroscopic rotor, an internal chamber in said rotor containing an ignitible propellent grain, nozzle means in said rotor providing a passage to the chamber, and a detonator for igniting the grain fitted in the passage provided in said rotor by said nozzle means.

10. The combination in an instrument of the class described of, a gyroscopic rotor, an internal chamber in said rotor adapted to receive an ignitible propellent grain, nozzle means in said rotor providing a passage to the chamber, and spring biased means for holding said rotor in a stationary condition having an element engaged with the wall of the passage provided in the rotor by the nozzle means.

11. In a gyroscopic instrument, a frame, a U-shaped ring having two ends, a closed side and an open side supported at its ends on the frame with freedom about an axis, a gyroscopic rotor of the reaction type having closed and open ends providing a cylindrical chamber therein adapted to receive a combustible grain, a spindle at the closed end of the rotor, bearing means between the closed side of the ring and the spindle supporting the rotor to spin about an axis normal to the axis of the ring with the open end of the rotor at the open side of the ring, and a removable plate connected to the rotor at the open side of the ring closing the open end of the chamber.

12. An instrument of the character claimed in claim 11, in which the reactive type rotor includes a nozzle at its periphery directed in a plane including the axis of the ring, and a passageway connecting the nozzle to the chamber at a location between the closed end of the chamber and the connected plate.

13. An instrument of the character claimed in claim 11, where the rotor is driven by the combustion gases of the ignited grain, including means for preventing the flow of gases driving the gyroscopic rotor through the rotor bearing means comprising a cover plate on the ring and co-operating annular flange and groove parts arranged in concentric relation to the rotor axis, one of said parts being located on said gyroscopic rotor and the other of said parts being located on said ring.

14. An instrument of the character claimed in claim 11, in which the reactive type rotor includes a nozzle at its periphery directed in the plane of the axis of the ring, and biased holding means for the gyroscopic rotor comprising a double ended spring, one end of which is fixedly connected to the frame and the other end of which is hooked to the internal wall of the nozzle.

15. In a gyroscopic instrument, a frame, a U-shaped ring having two ends, a closed side and an open side supported at its ends on the frame with freedom about an axis, a gyroscopic rotor providing a cylindrical chamber therein with a closed end and an open end, means connecting the closed end of the rotor and closed side of the ring for supporting the rotor to spin about an axis normal to the ring axis, a nozzle at the periphery of the rotor directed in a plane including the axis of the ring connected to the chamber at a location between the ends thereof, and a removable plate connected to the rotor at the open side of the ring closing the open end of the chamber.

16. In a rate gyro, a frame, a gimbal ring having two ends, a closed side and an open side, means interconnecting the frame and gimbal ring at the respective ends thereof supporting the ring with restrained freedom about an axis, a gyroscopic rotor providing a closed and open ended cylindrical chamber, means connecting the closed end of the rotor and closed side of the ring for supporting the rotor to spin about an axis normal to the ring axis, a nozzle at the periphery of the supported rotor directed in a plane including the axis of the ring, a passageway connecting the nozzle to the chamber at a location between the ends of the chamber, a removable plate connected to the rotor at the open side of the ring closing the open end of the chamber, and a combustible grain contained within the closed chamber.

17. A gyro as claimed in claim 16, where the rotor is driven by the combustion gases of the ignited grain, and in which said rotor is grooved at the end thereof adjacent the gimbal ring, and said gimbal ring includes a fixed annular flange extending within the groove in the rotor, said flange and groove cooperating to prevent the flow of gases driving the rotor through the means supporting the rotor on the ring.

18. A gyro as claimed in claim 16, including a biased spring having an end fixed to the frame and a hooked end adapted to engage the internal wall of the nozzle to hold the rotor in a stationary condition.

References Cited in the file of this patent
UNITED STATES PATENTS

| | | |
|---|---|---|
| 2,427,549 | Carlson | Sept. 16, 1947 |
| 2,743,576 | Crockett | May 1, 1956 |
| 2,752,684 | Bently et al. | July 3, 1956 |
| 2,754,789 | Minisini | July 17, 1956 |
| 2,732,721 | Summers | July 31, 1956 |